Oct. 16, 1951 H. H. PAYZANT 2,571,603
APPARATUS FOR SCARFING BOARD ENDS
Filed Feb. 19, 1946 2 SHEETS—SHEET 1

HENRY H. PAYZANT
INVENTOR.

BY *E. A. Buckhorn*
ATTORNEY

Patented Oct. 16, 1951

2,571,603

UNITED STATES PATENT OFFICE 2,571,603

APPARATUS FOR SCARFING BOARD ENDS

Henry H. Payzant, Seattle, Wash., assignor, by mesne assignments, to Timber Structures, Inc., a corporation of Delaware Application February 19, 1946, Serial No. 648,650

2 Claims. (Cl. 144—125)

The present invention relates to wood manufacture and more particularly to improvements in methods and apparatus for scarfing the ends of boards to be joined together.

Frequently it is desirable to join relatively short length boards together in end to end relation by cemented scarf joints to form long lengths. The strength of the joint depends on proper formation of the scarfed end surfaces so that when they are pressed together with a film of adhesive therebetween the adjacent overlapping surfaces will be firmly bonded together over their entire respective areas. According to procedures heretofore used and with apparatus heretofore available it has not been possible to scarf the ends of boards from random stock with a sufficiently high degree of accuracy to insure the formation of joints of maximum strength in each instance.

It is a general object of the present invention, therefore, to provide a new and improved method for scarfing the ends of boards to be joined together whereby scarf joints of maximum strength may more readily be obtained.

More specifically it is an object of the present invention to provide a new and improved method for scarfing the end portions of boards whereby the scarfs may be formed with a relatively high degree of accuracy substantially irrespective of a warped or twisted condition of the boards.

A still further object of the present invention is to provide a new and improved apparatus for scarfing the end portions of boards which are to be united together by cemented joints therebetween.

For a consideration of what is believed novel and inventive the attention is directed to the following description taken in connection with the accompanying drawings while the features of novelty will be pointed out with greater particularity in the appended claims.

Figure 1:
Figure 2:
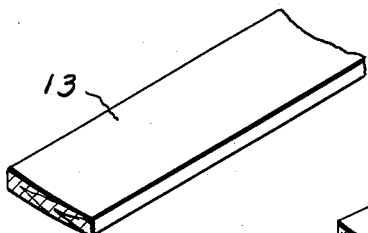
Figure 3:
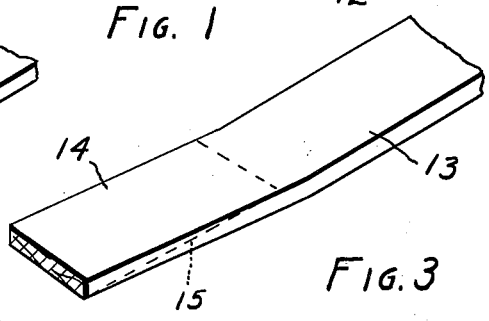
Figure 4:
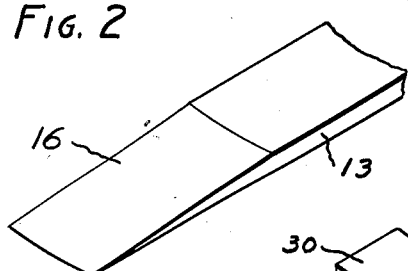
Figure 7:
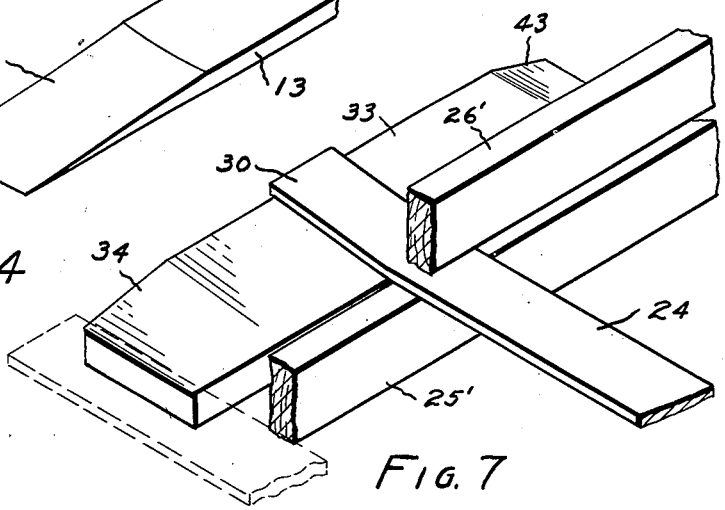
Figure 9:
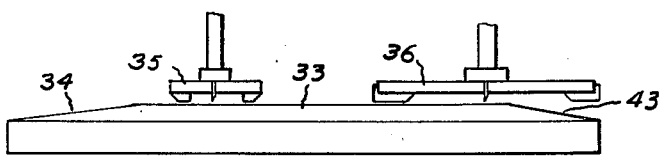
Figure 8:
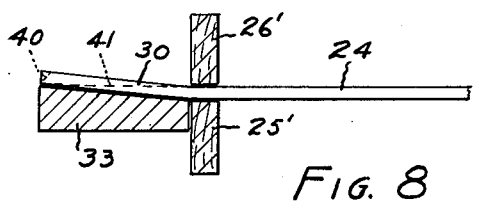
Figure 5:
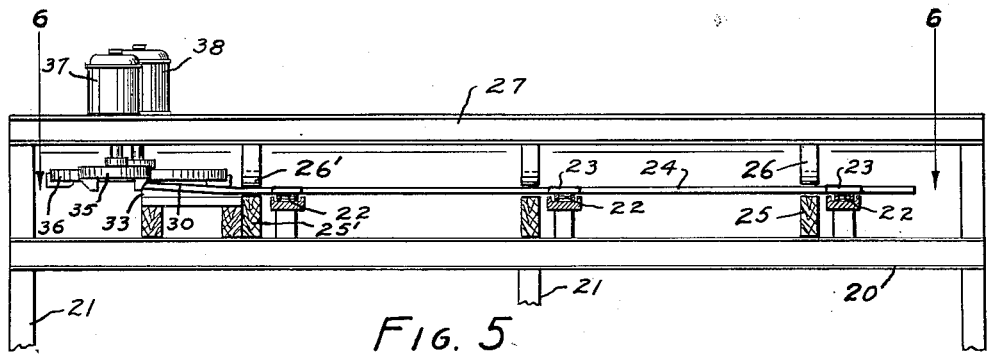
Figure 6:
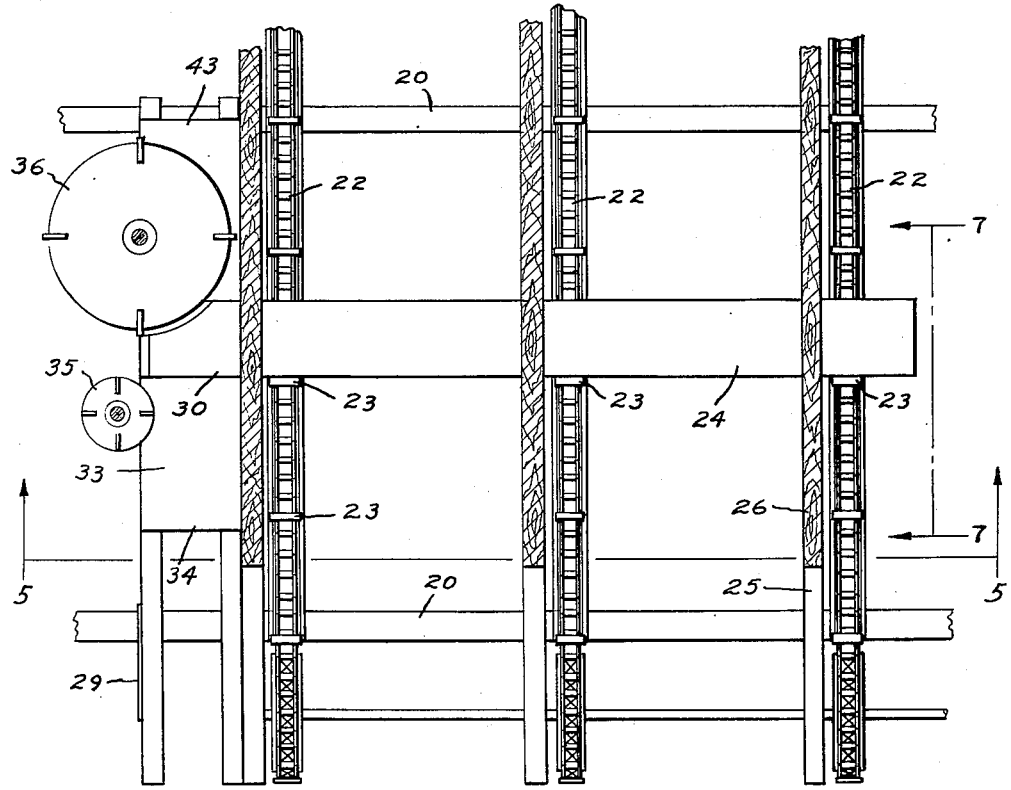

In the drawings, Fig. 1 is a side elevation showing a portion of a laminted wooden member; Fig. 2 is a fragmentary view illustrating the end portion of a board; Fig. 3 is a fragmentary view illustrating a step in the method of scarfing of the present invention; Fig. 4 is a fragmentary view illustrating the end portion of a board scarfed in accordance with the present invention; Fig. 5 is an end view, partly in section illustrating apparatus of the present invention and taken along the line 5—5 of Fig. 6; Fig. 6 is a sectional plan view of the apparatus of the present invention taken along the line 6—6 of Fig. 5; Fig. 7 is an enlarged view in perspective illustrating certain details of the invention; Fig. 8 is a diagrammatic view illustrating certain features of the apparatus of the invention and Fig. 9 is a further diagrammatic view illustrating certain other features of the apparatus of the present invention.

In the fabrication of glued laminated wood products, for example, it is desirable to use low grade lumber because of the lower cost and relative abundance thereof. A relatively high proportion of lumber otherwise sound, is defective merely for the reason that in the drying or seasoning it is either warped or twisted to a greater or lesser degree. Following the assembly of a plurality of laminations with a film of adhesive therebetween and upon application of pressure the various pieces of wood are flattened out irrespective of their previous warped or twisted condition. In order for tight joints to be formed between the adjacent ends it is necessary that the scarf surfaces on the ends of the boards must extend at corresponding angles of taper and in corresponding planes when the boards are in the flattened condition. If, for example, the end portion of a cupped board is scarfed along a plane while the board is in such condition, then when the board is subsequently flattened the scraf surface will then be cupped so that it will not match the scarf surface of the end of an adjacent board section which is to be joined thereto. It has therefore been generally necessary heretofore to use only boards which are initially straight and flat in the fabrication of laminated products and consequently the cost of the finished product was excessively high.

The features of the present invention and the importance thereof can be more clearly understood by reference to the explanatory views of Figs. 1 to 4 inclusive. In Fig. 1 is illustrated a laminated building member 10 such as a beam consisting of a plurality of laminations each of which is made up of relatively short lengths of boards 11 joined together by tapered scarf joints as indicated at 12. The laminations as well as the boards forming each lamination are bonded together by means of an adhesive film therebetween which is set while the assembly is compressed between suitable clamps. In Fig. 2 is illustrated the end portion of a board 13 which is transversely warped or cupped. It will be apparent that if the end portion is scarfed while it is in the cupped condition the scarf surface which was initially plane will be either convexly or concavely curved when the board is flattened out in the lamination assembly. Only in the event that the scarf surface of the adjacent board end is cooperatively and oppositely curved will the two scarf surfaces match over their entire respective areas to form a tight bond therebetween. Normally, such an occurrence would be extremely rare and generally the adjacent scarf surfaces would engage only at certain points of limited area while the remaining surface portions would remain separated and consequently unbonded.

In accordance with the present invention I flatten the end portion of the board 13 by bending it along a line extending transversely thereof as indicated at 14 in Fig. 3 and while holding it in such a bent condition passing it through a suitable cutting mechanism to provide a scarf surface on the end thereof, the cutting plane being indicated by the dotted lines 15. The angle through which the end portion of the board is bent is relatively slight and well within the elastic limit of the fibers of the board so that no fracture is caused along the bending line 14. After the board passes from the cutting tool it reassumes its normal shape and in Fig. 4 is illustrated the same board 13 with the end surface scarfed as at 16 and in which case it will be noted that the surface 16 is cupped by an amount corresponding to the warped condition of the board. It will be obvious that after the board 13 is placed in an assembly of laminations and upon application of clamping pressure the board will be flattened and the scarfed surface 16 will also be flattened into the plane in which it was originally cut.

Referring to Figs. 5 and 6, one form of apparatus which I have devised for carrying out the above method of scarfing will now be described. The apparatus includes a framework consisting of lower transverse frame members 20 supported upon uprights 21 and upon which framework is mounted a plurality of parallel horizontally extending chains 22. The chains are each provided with a plurality of spaced lugs 23 which are aligned and adapted to engage with one edge of a board 24 positioned across the chains and by means of which the board is carried along edgewise in a direction at right angles to the length thereof in a predetermined horizontal plane. The board is furthermore guided in such a plane by aligned lower and upper guide members 25 and 26 respectively, the adjacent edges of which are spaced apart a distance slightly greater than the thickness of the boards. Guide members 25 and 26 extend parallel with the chains 22, the lower members 25 being supported upon the lower frame members 20 while the upper guide members 26 are supported in a depending relation from the upper frame members 27. The boards 24 are positioned upon the chains 22 with one end, which has been previously suitably squared, in engagement with the upstanding guide rail 29 whereby the length of end portion 30 of the board overhanging the upper and lower guide members 25' and 26' is gauged to a predetermined distance.

For bending the overhanging end portion 30 of the board 24 upwardly to a relative position as illustrated in Fig. 3, a backing member 33 is arranged in the path of travel of the end portion 30, and which is shown more clearly in the fragmentary view of Fig. 7. The forward end portion 34 of the member 33 slopes downwardly so that the leading edge of the board passes thereabove and is deflected upwardly as it moves along from the position shown in dotted lines to that shown in full lines. The central portion of the backing member 33 defines a plane surface which slopes upwardly in the direction of the board and hence its plane intersects the plane of the midsection of the board, on the opposite side of the guide members 25' and 26', along a line extending in a direction transversely of the board. The angle of slope of the central portion of member 33 is sufficient to effect such bending of the board end portion as may be necessary to cause complete flattening thereof irrespective of any warped or twisted condition it may have had but well within the elastic limits of the wood fiber.

The board 24 with the end portion 30 bent upwardly passes beneath a suitable cutting means for removing wood from the upper surface thereof to provide a tapered scarf surface thereupon. It will be obvious that any suitable saw, cutter or planer arrangement may be provided for scarfing the upper surface of the board end portion and while I have shown a particular arrangement of cutters the present invention is not to be limited thereto. According to the illustrated embodiment I provide a pair of cutter discs 35 and 36 both of which are mounted directly on the lower ends of driving shafts depending from motors 37 and 38 respectively mounted thereabove. The foremost disc 35 is provided with a plurality of cutter knives in its periphery which make a rough 45° cut across the upper edge of the board as illustrated by dotted lines 40 in Fig. 8. Such a preliminary rough cut is necessary, particularly in scarfing boards thicker than ¾ inch, due to the large cross section of wood required to be removed at the extreme end. If it were attempted to remove the entire quantity of wood with a single cut, a thin feather edge at the end of the board could not be produced. The thin, feather edge portion desired to be left intact at the end of the board would be torn free and carried away by the adjacent portions of the cut. The result would be a rough, jagged end unsuited for the desired purposes particularly as regards those members assembled at the opposite outer sides of the laminated beam. It is preferred that the rough cut remove a substantial portion of the wood at the extreme end of the board and, while a 45° angle cut is made transversely of the board end in this instance, it will be obvious that a rough cut at an angle more closely approximating the angle of the scarf taper may be made if desired. The vertical supporting shaft for the cutter disc 36 is substantially aligned with the path of travel of the outer end of the board while the radius of the cutter disc 36 is at least as long as the scarf surface to be formed thereby. The second disc 36 is provided with a plurality of knives in its periphery and which are adapted for cutting away the upper surface of the board end portion 30 such as along the dotted line 41 to form the scarf surface.

Referring further to Fig. 8 it will be observed that the outermost end portion 30 of the board 24 is bent up by an amount substantially equal to the thickness of the board so that the plane of the scarf surface indicated by the dotted line 41 is substantially aligned with the upper surface of the midsection of the board. The scarf surface is of course inclined at an angle with respect to the plane of the upper surface of the backing member 33 supporting the lower surface of the board end portion.

The cutter knives on the disc 36 are relatively long so that the cut made by each overlaps the cut of the preceding knife by a considerable amount whereby the finished surface will be left smooth and free of knife marks. Referring to the view of Fig. 9 it will be noted that the rear end 43 of the backing member 33 slopes downwardly from a point slightly to the rear of the center of the scarfing disc 36. The board in moving along the inclined surface of the backing member 33 commences to straighten out after it has passed the center of the disc 36 so that the cutter knives on the rear side of the disc will not come into cutting relation with the surface of the board substantially before the knives reach a direction of travel at right angles to the grain of wood. The principal cutting action of the knives of the disc 36 will of course be in a direction longitudinally of the wood grain and toward the outer end of the board. With this arrangement of cutter discs and with their relation to the backing member as shown a thin edge may readily be formed at the outer end of the board and with a minimum of tearing even at the corners thereof.

It will be obvious from the description given that board end portions will be accurately scarfed in view of the fact that the lower surface of the end portion of the board is positively positioned in a predetermined plane and that the plane of the scarf surface is accurately formed in every instance with a definite fixed relation to the lower flattened surface of the board end portion. Thus whether the boards are initially flat, warped or twisted the scarf surfaces are accurately formed in every instance and this is true whether the cupped surface of the warped board faces up or down. In the event both ends of the boards are to be scarfed, they may be run through the machine a second time only turned end for end.

While I have shown one particular form of bending means for supporting the end portion of the board which is to be scarfed it will be obvious to those skilled in the art that various arrangements of bending means for flattening the board ends may be devised without departing from the spirit of the present invention. The same is true as to various other specific details illustrated in connection with the apparatus described which I have provided for carrying out the mentioned steps of my invention.

In the following claims the words "scarf" or "scarfing" is used to denote a tapered plane surface formed flatwise on the end portion of a board and tapering from a thin edge extending transversely at right angles across the outer end of the board to a line on the upper surface of the board back from the end thereof.

Having described the invention in what is considered to be a preferred embodiment thereof it is desired that it be understood that in the appended claims I intend to cover all such modifications and variations as fall within the true spirit and scope of the invention.

What I claim is:

1. In an apparatus for scarfing the end portion of a board having a horizontal conveyor means for moving a board edgewise in a direction at right angles to the length thereof and a supporting means extending parallel with the direction of the path of travel of said board for holding it in a predetermined fixed plane, the outer end portion of said board extending beyond said supporting means, the combination comprising a backing member arranged in the path of travel of said board end portion, the central portion of the upper surface of said backing member being inclined at an angle with respect to said predetermined plane whereby upon engagement thereof by said board end portion said board end portion is bent upwardly through a relatively slight angle along a line extending transversely of said board, a rough cutter and a finish cutter disc rotatable in horizontal planes above said central portion of said backing member, said rough cutter disc being mounted ahead of said finish cutter disc as regards the direction of travel of said board, drive shafts for said discs extending upwardly therefrom, said discs having knives extending from the lower surface thereof, the knives of said first cutter disc having cutting edges extending at a substantially 45° angle with respect to the plane of the board end portion and adapted for making a first cut at a substantially 45 degree angle along the upper edge of said board end portion, the axis of rotation of said finish cutter disc being substantially aligned with the path of travel of the outer end of said board, said finish cutter disc having a radius at least equal to the length of the finished scarf to be formed on said board end portion and means for driving said last mentioned disc in such a direction that the wood is removed from the upper surface of said board end portion in a direction substantially longitudinally of the grain and toward the outer end thereof.

2. In an apparatus for scarfing the end portion of a board including a conveyor means for moving said board edgewise in a direction at right angles to the length thereof and means for engaging and supporting the greater portion of the said board during movement thereof in a predetermined fixed plane, the combination comprising a backing member arranged in the path of travel of an end portion of said board, the central portion of the upper surface of said backing member being inclined at an angle with respect to said predetermined plane whereby upon engagement thereof by said board end portion said board end portion is bent upwardly by a relatively slight angle along a line extending transversely of said board, a cutter disc rotatable about an axis perpendicular to said predetermined plane, said cutter having a radius substantially equal to the length of the scarf to be formed on said board end portion and having cutter knives extending from the lower surface thereof, the forward portion of said cutter disc extending above said central portion of said backing member whereby the upper surface of said board end portion will be scarfed during movement thereof over said backing member, said backing member sloping away from said cutter disc beneath the trailing side of said disc with respect to the direction of travel of said board.

HENRY H. PAYZANT.

REFERENCES CITED

The following references are of record in the file of this patent:

UNITED STATES PATENTS

| Number | Name | Date |
| --- | --- | --- |
| 136,201 | Atkins | Feb. 25, 1873 |
| 247,242 | Clancy | Sept. 20, 1881 |
| 305,868 | Ward | Sept. 30, 1884 |
| 665,732 | Ensign | Jan. 8, 1901 |
| 1,494,000 | McGowan et al. | May 13, 1924 |
| 2,172,093 | Thompson et al. | Sept. 5, 1939 |
| 2,214,449 | Berry | Sept. 10, 1940 |
| 2,252,112 | Bailey | Aug. 12, 1941 |
| 2,389,944 | Winkel | Nov. 27, 1945 |